United States Patent
Lu et al.

(10) Patent No.: US 9,036,220 B2
(45) Date of Patent: May 19, 2015

(54) CONTACT IMAGE SENSING DEVICE

(71) Applicant: Creative Sensor Inc., New Taipei (TW)

(72) Inventors: Ting-Pin Lu, New Taipei (TW);
Ming-Chieh Lin, New Taipei (TW);
Jia-Lin Lee, New Taipei (TW)

(73) Assignee: CREATIVE SENSOR INC., New Taipei (TW)

( * ) Notice: Subject to any disclaimer, the term of this patent is extended or adjusted under 35 U.S.C. 154(b) by 0 days.

(21) Appl. No.: 14/157,072

(22) Filed: Jan. 16, 2014

(65) Prior Publication Data

US 2015/0070735 A1   Mar. 12, 2015

(30) Foreign Application Priority Data

Sep. 12, 2013   (TW) .............................. 102217215 U

(51) Int. Cl.
*H04N 1/04*     (2006.01)
*H04N 1/028*    (2006.01)
*H04N 1/10*     (2006.01)

(52) U.S. Cl.
CPC ......... *H04N 1/02855* (2013.01); *H04N 1/0286* (2013.01); *H04N 1/10* (2013.01)

(58) Field of Classification Search
CPC .............. H04N 1/02815; H04N 1/193; H04N 1/40056; H04N 1/1013; H04N 1/0287; H04N 3/1581; H04N 1/031; H01L 27/14665
USPC ................. 358/475, 484, 482, 483, 512–514; 250/208.1, 239, 216, 234–236; 399/211
See application file for complete search history.

(56) References Cited

U.S. PATENT DOCUMENTS

| | | | |
|---|---|---|---|
| 7,177,082 B2 * | 2/2007 | Wakisaka et al. | 359/619 |
| 7,385,169 B2 * | 6/2008 | Saitou et al. | 250/208.1 |
| 7,722,223 B2 * | 5/2010 | Saito et al. | 362/311.06 |
| 7,738,146 B2 * | 6/2010 | Osakabe et al. | 358/497 |
| 2009/0135453 A1 * | 5/2009 | Wakisaka et al. | 358/474 |
| 2013/0222918 A1 * | 8/2013 | Nemoto | 359/622 |

FOREIGN PATENT DOCUMENTS

JP     2006165693 A  *  6/2006

* cited by examiner

*Primary Examiner* — Cheukfan Lee
(74) *Attorney, Agent, or Firm* — Muncy, Geissler, Olds & Lowe, P.C.

(57) ABSTRACT

A contact image sensing device includes a housing, a light emitting unit, a red lens array, a sensing unit, and a protecting component. The housing includes a top surface, a bottom surface, an accommodating groove, and a slot. The bottom surface is opposite to the top surface. The accommodating groove is formed on the top surface and concave toward to bottom surface. The slot penetrates the top surface and the bottom surface. The light-emitting unit is arrange within the accommodating groove. The rod lens array is arranged within the slot. The sensing unit is arranged below the housing. The protecting component includes a main body, a recess, and a lighting slot communicating with the recess, a top end of the rod lens array is assembled with the recess. The main body of the protecting member forms at least one containing recess. A combining component for combining the rod lens array and the protecting member is disposed within the containing recess.

9 Claims, 9 Drawing Sheets

CONTACT IMAGE SENSING DEVICE

BACKGROUND OF THE INVENTION

1. Field of the Invention

The present invention relates to image sensing device, and in particular to a contact image sensing device.

2. Description of Related Art

Contact image sensor is one of linear image sensors, and is applied to scanner, fax machine, and multi function business machine, plane images or documents are scanned into the contact image sensor and then converted to electronic form for convenience of storage, display, or transmission.

The operating principle of the contact image sensor is projecting light generated from a light source thereof to the image or document, and converging reflected light reflected by the image or document on photosensitive component, such as charge-coupled device (CCD) or complementary metal oxide semiconductor (CMOS) by a lens assembly. The photosensitive component then converts optical signal (the reflected light) into electronic signal and generates analog or digital pixel data.

Reference is made to FIG. 1, which is a sectional view of a conventional contact image sensor. The contact image sensor 1 includes a housing 10, a light emitting component 12, a rod lens assembly 14, and a sensing unit 16. The housing 10 forms an accommodating groove 100 and a through groove 102. The light emitting component 12 is arranged within the accommodating groove 100 and used for providing light to illuminant an object (not shown). The rod lens assembly 14 is arranged within the through groove 102. The sensing unit 16 includes a circuit board 160 and a plurality of sensing components 162 placed on the circuit board 160 and electrically connected thereto. The light emitted from the light emitting component 12 and transmitted to the object is reflected by the object and images on the sensing unit 16 via the rod lens assembly 14.

However, the dimension of the rod lens assembly 14 is fixed, and when the rod lens assembly 14 is assembled with in the housing 10, a top end of the rod lens assembly 14 will expose out of the housing 10 such that a surface of the top end of the rod lens assembly 14 for light entering will be scratched by impact or friction and imaging quality of the contact image sensor is then influenced.

SUMMARY OF THE INVENTION

It is an object to provide a contact image sensing device to overcome above-mentioned problems.

Accordingly, the contact image sensing device comprises a housing, a light emitting unit, a rod lens array, a sensing unit, and a protecting component. The housing comprises a top surface, a bottom surface opposite to the top surface, an accommodating groove formed on the top surface and concave to the bottom surface, and a slot penetrating the top surface and the bottom surface. The lighting unit has an optical axis, the lighting unit is arranged within the accommodating groove. The rod lens array is arranged within the slot. The sensing unit is arranged below the housing.

The protecting member comprises a main body. The main body forms a recess and a lighting slot communicating with the recess, a top end of the rod lens array assembled with the recess.

In an embodiment of the present invention, the protecting element forms a chamfered section, the chamfered section is formed on a top edge of the main body close to one side of the lighting unit.

In an embodiment of the present invention, a height of the protecting member is higher than a height of the rod lens array by ⅕ of the height of the rod lens array.

In an embodiment of the present invention, the main body of the protecting member forms at least containing recess, a combining component for combining the rod lens array and the protecting component is disposed within the containing recess, the combining component is resin.

In an embodiment of the present invention, the protecting member forms at least one fastening component disposed far away from the lighting unit.

In an embodiment of the present invention, the accommodating groove comprises a bottom wall, an including angle spans between the bottom wall and the top surface, the including angle is smaller than 90 degrees.

In an embodiment of the present invention, the optical axis is substantially perpendicular to the bottom wall.

In an embodiment of the present invention, the rod lens array includes a plurality of rod lenses, the sensing unit includes a plurality sensing components arranged correspondingly below the rod lenses.

In an embodiment of the present invention, the sensing unit further comprises a circuit board, the sensing components are placed on the circuit board and electrically connected thereto.

In an embodiment of the present invention, the lighting unit comprises a fixing seat, a lighting component, a light guide component, and a light-reflecting component, the lighting component is arranged on one side of the fixing seat, the light guide component is arranged on the other side of the fixing seat for receiving light emitted from the lighting component, the light guide component comprising a light-emitting surface, and the light-reflecting component partially covers the light guide component, and the light-emitting surface exposes out of the light-reflecting component.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
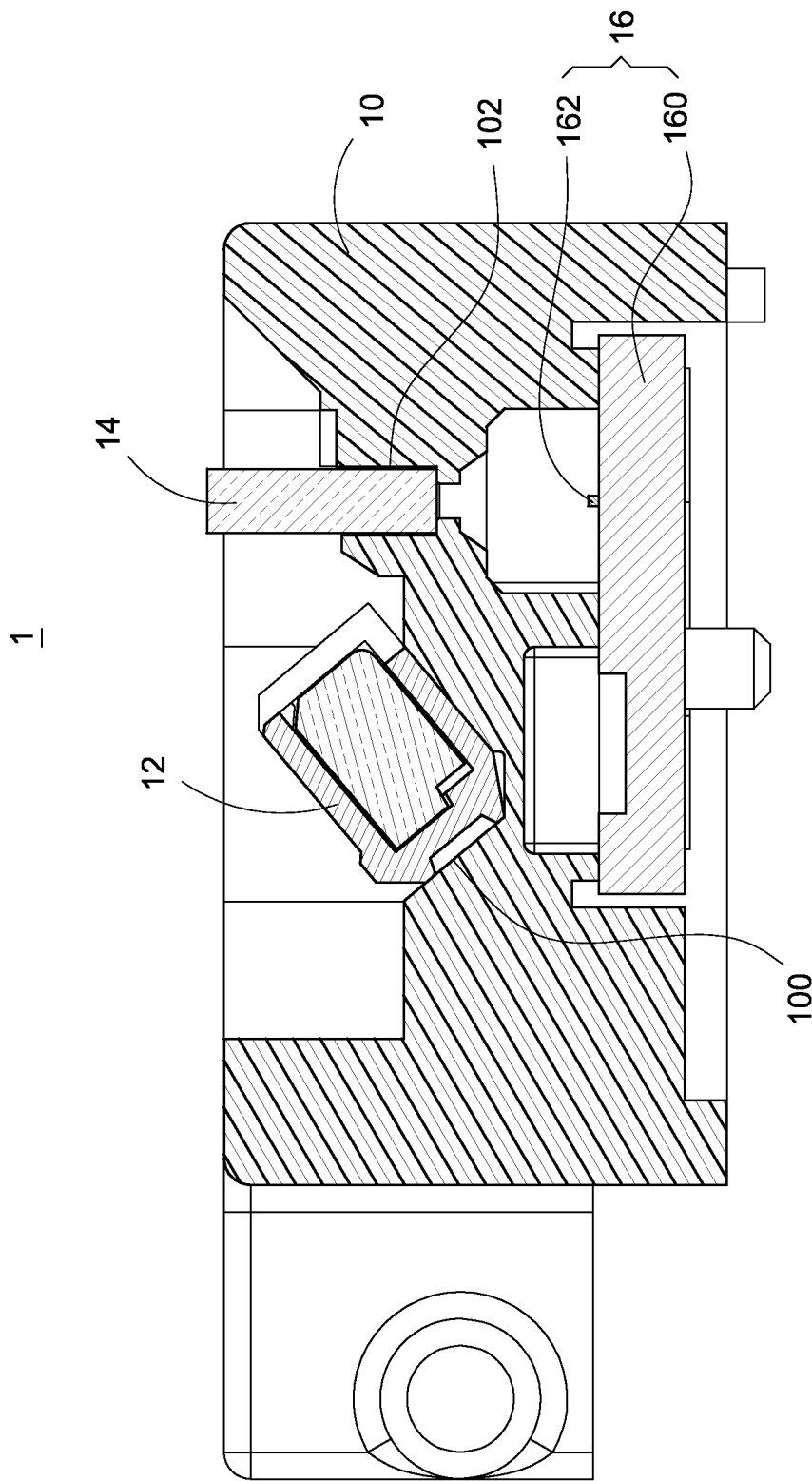
FIG. 1 is a sectional view of a conventional contact image sensor.
Figure 2:
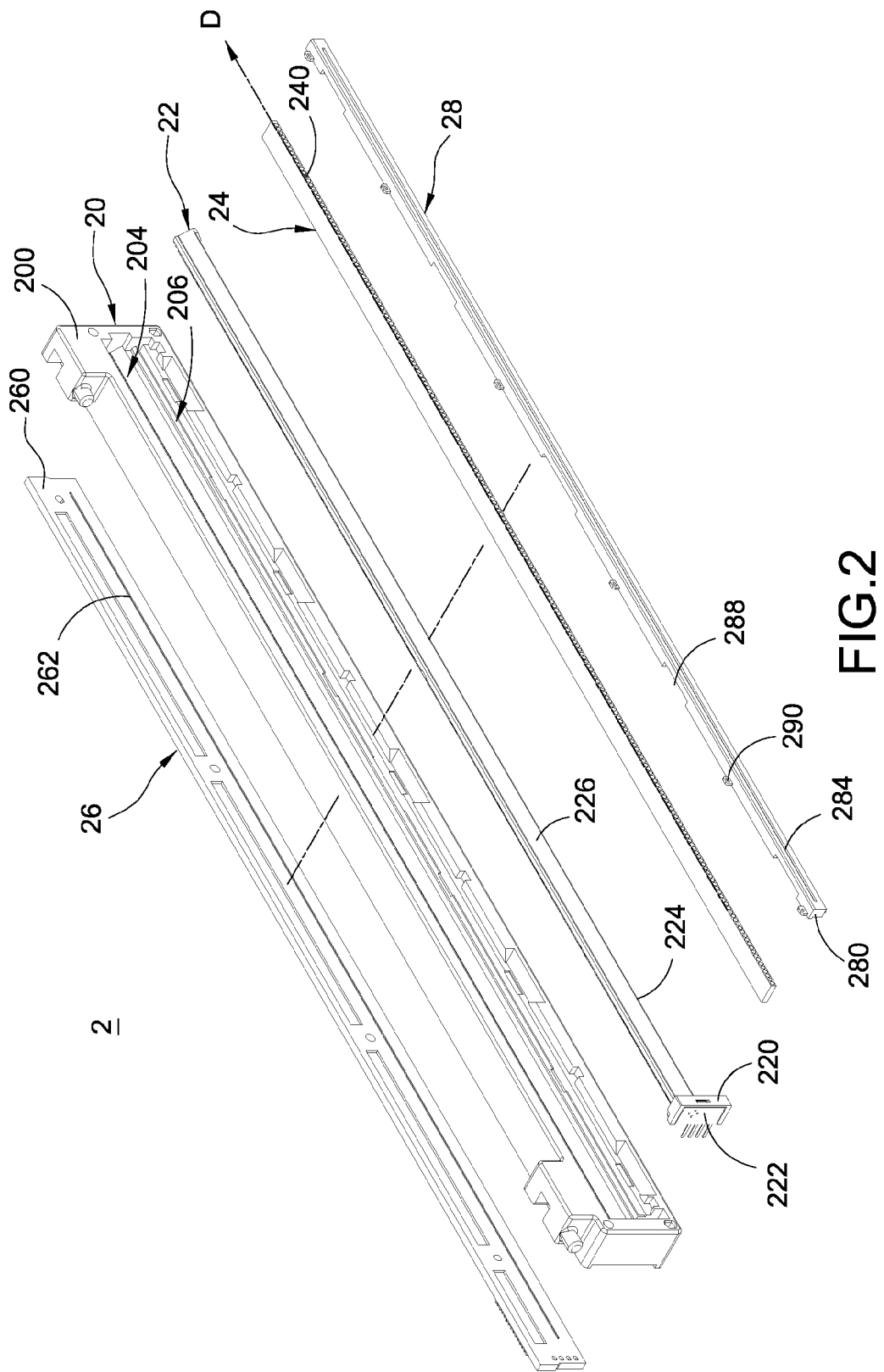
FIG. 2 is an exploded view of a contact image sensing device according to a first embodiment of the present invention.
Figure 3:
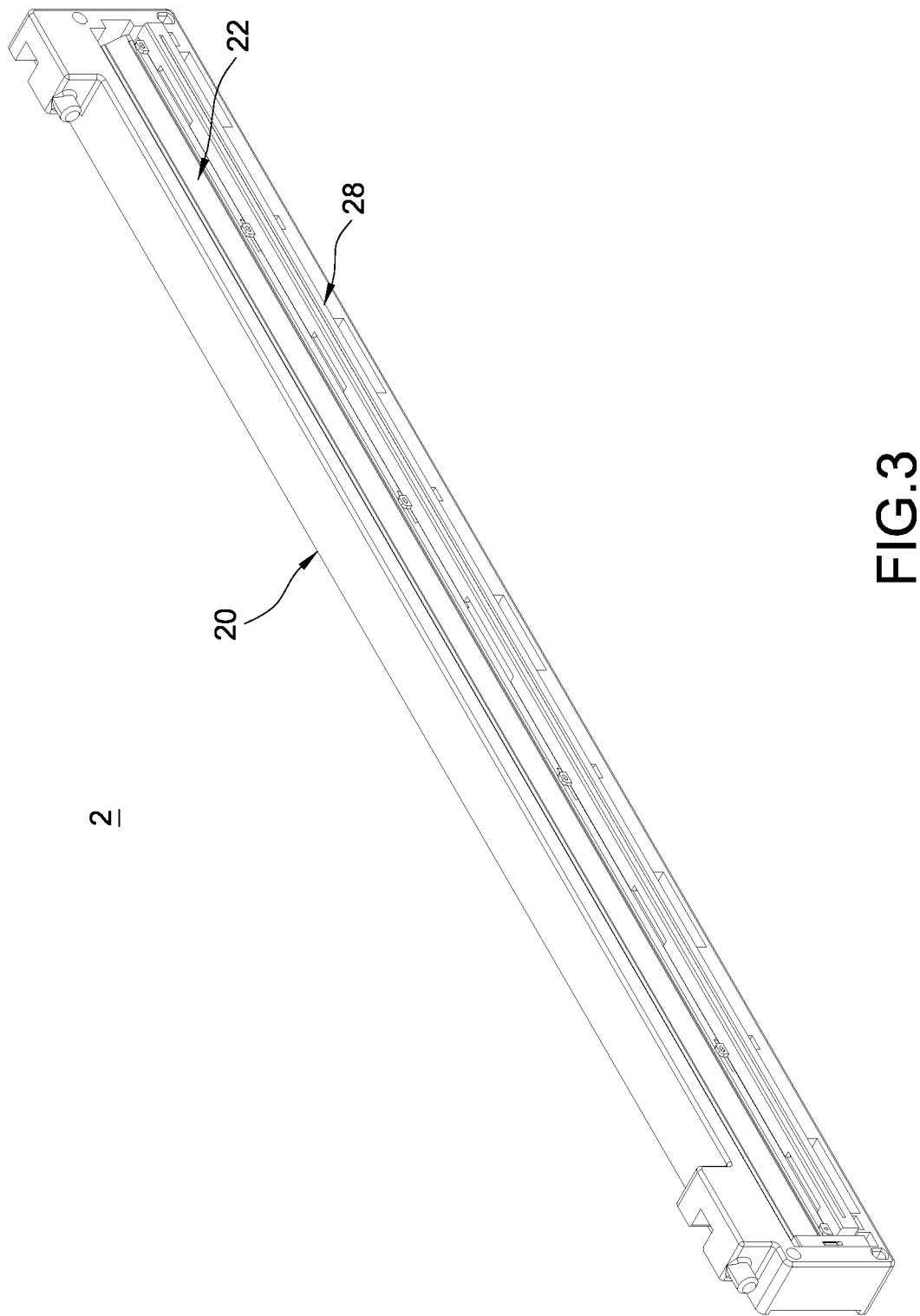
FIG. 3 is an assembled view of the contact image sensing device according to the first embodiment of the present invention.
Figure 4:
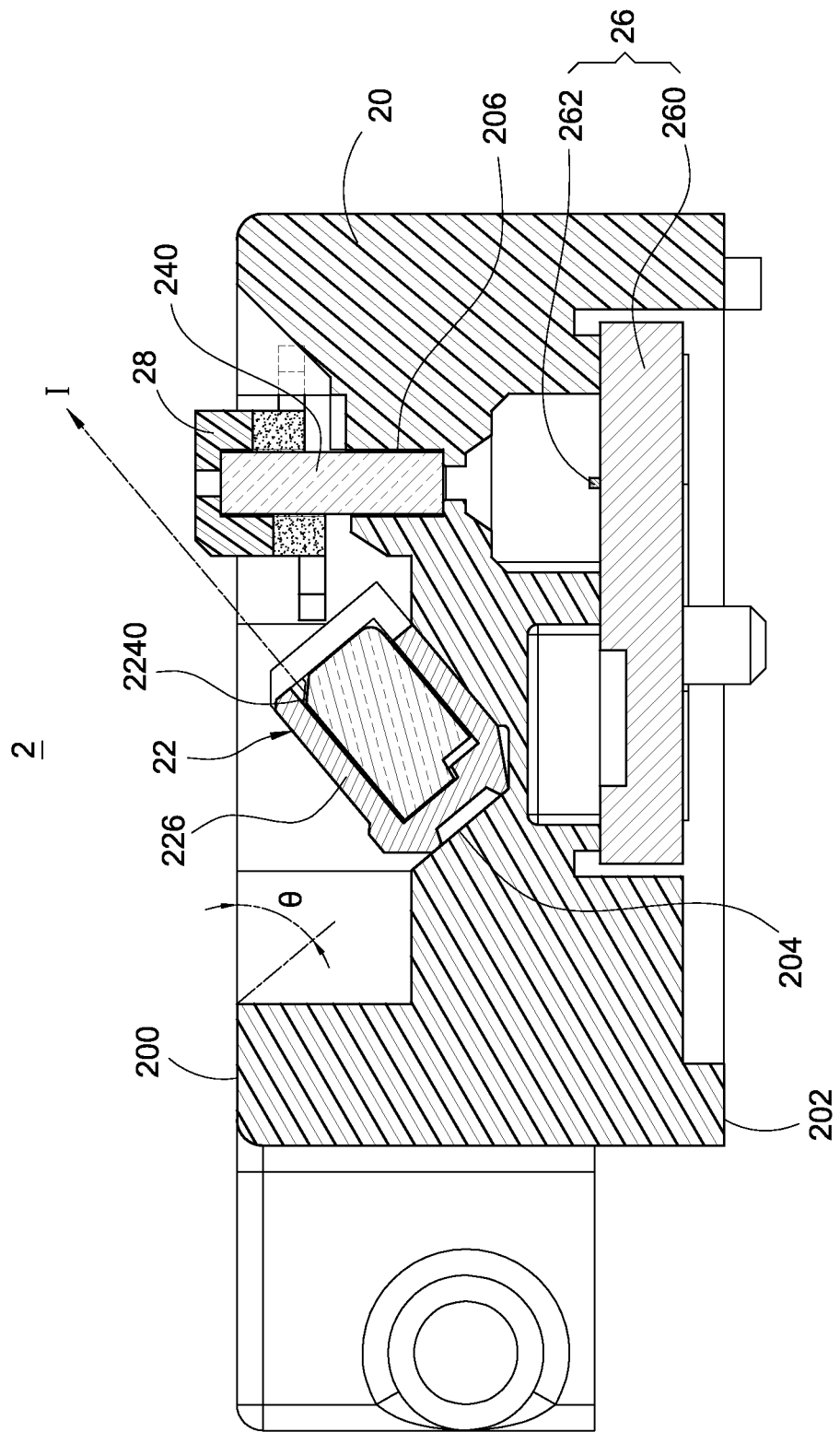
FIG. 4 is a sectional view of the contact image sensing device according to the first embodiment of the present invention.
Figure 5:
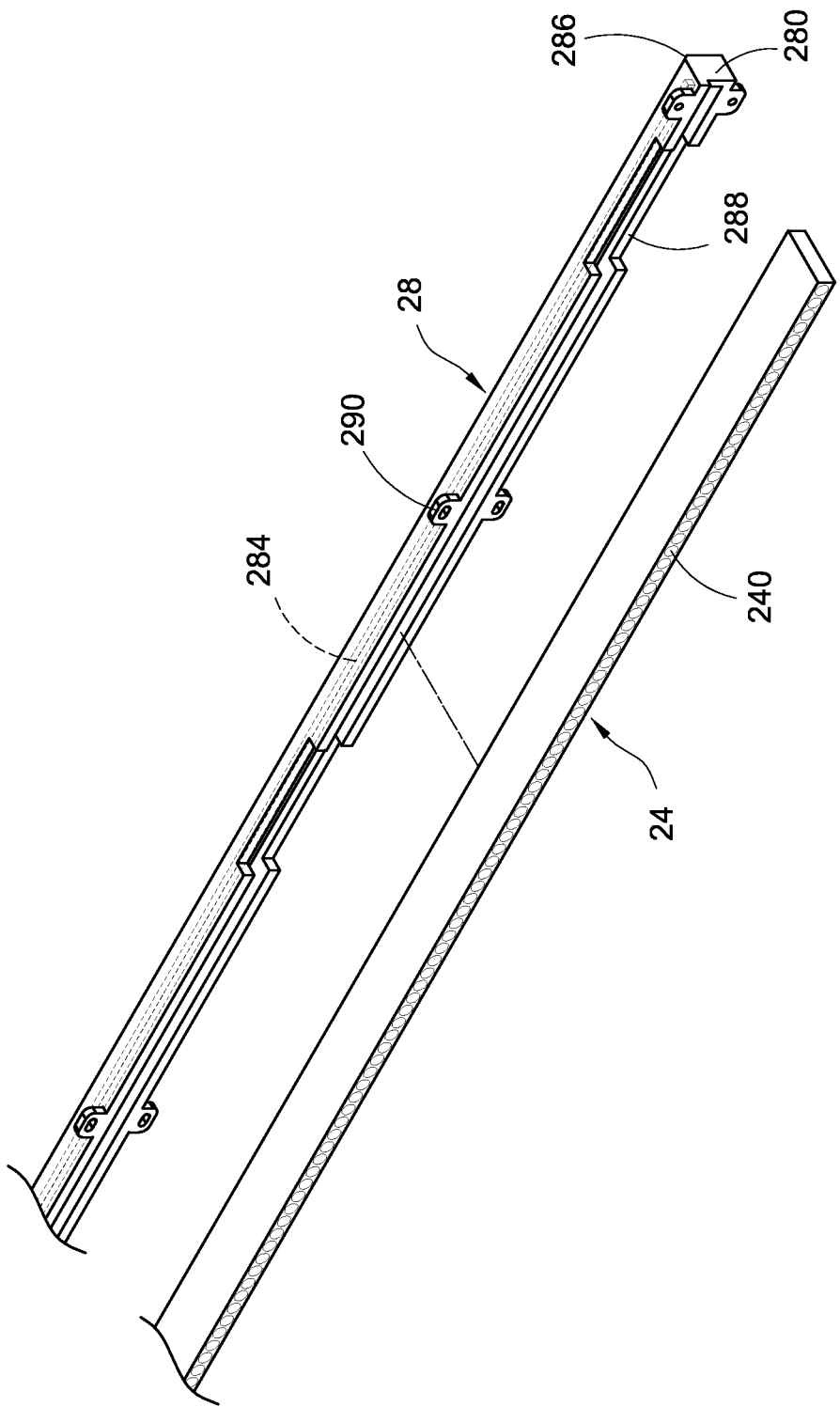
FIG. 5 is an exploded view of a rod lens array and a protecting member according to a first embodiment of the present invention.
Figure 6:
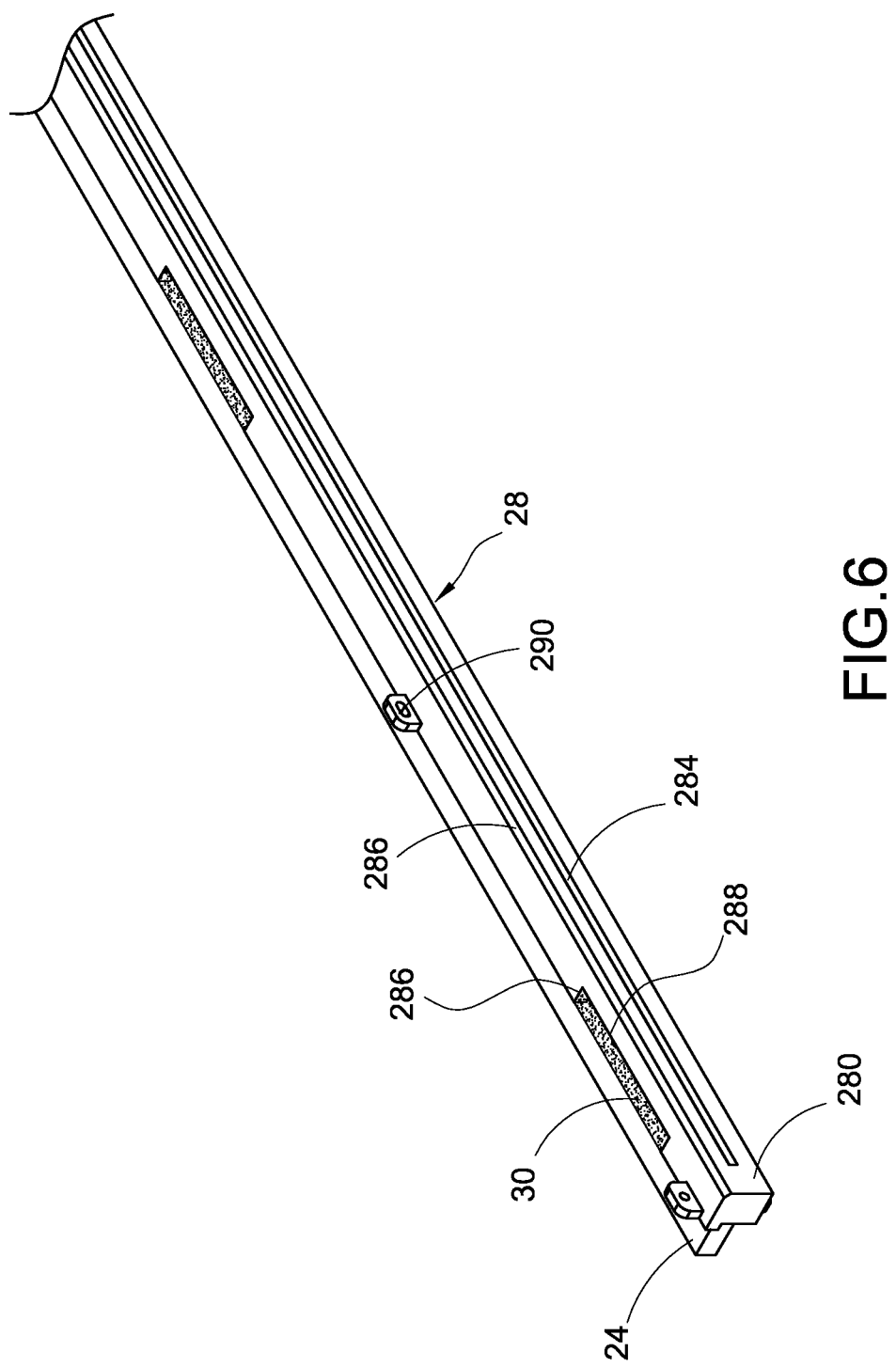
FIG. 6 is an assembled view of the rod lens array and protecting member according to the first embodiment of the present invention.
Figure 7:
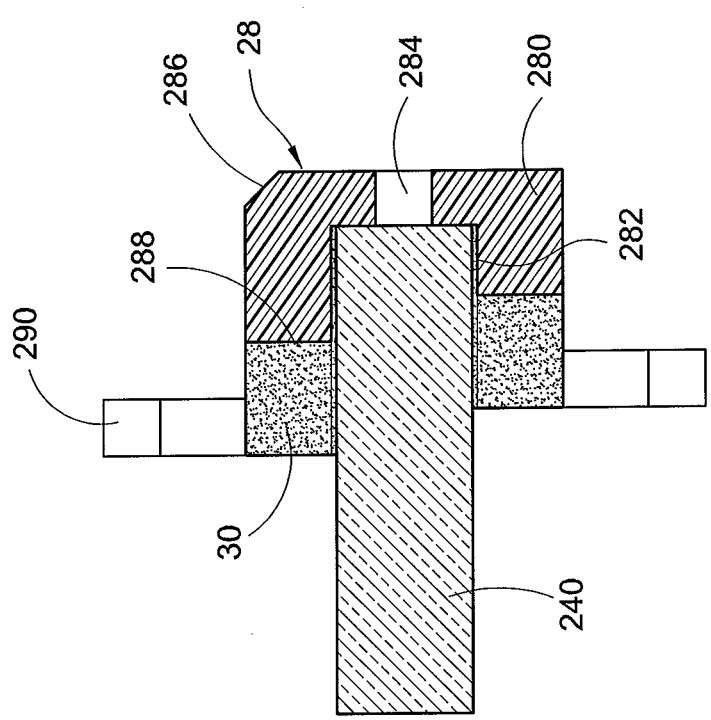
FIG. 7 is a sectional view of the rod lens array and the protecting member according to the first embodiment of the present invention.

Reference is made to FIG. 2, FIG. 3, and FIG. 4, FIG. 2 is an exploded view of a contact image sensing device according to a first embodiment of the present invention, FIG. 3 is an assembled view of the contact image sensing device according to the first embodiment of the present invention, and FIG. 4 is a sectional view of the contact image sensing device according to the first embodiment of the present invention. The contact image sensing device 2 is applied to scanner, fax, and multi-function business machine for sending an object image placed thereon. The contact image sensing device 2 includes a housing 20, a lighting unit 22, a rod lens array 24, a sensing unit 26, and a protecting member 28.

The housing 20 includes a top surface 200, a bottom surface 202 opposite to the top surface 200, an accommodating groove 204, and a slot 206. The housing 20 is, for example, made of material with dark colors, such as black. However, the housing 20 is not recommended to make by material with colors having light reflecting effect (such as white or silver) because material having light reflecting effect shall reflect imaging light reflected by the object, and then the imaging light cannot successfully transmit to the sensing unit 26, the sensing effect of the contact image sensing device 2 is deteriorated. The bottom surface 202 is parallel to the top surface 200. The accommodating groove 204 is formed on the top surface 200 and concave toward the bottom surface 202. The accommodating groove 204 includes a bottom wall 2040, and an including angle θ spans between the bottom wall 2040 and the top surface 200. The slot 206 is structure penetrating the top surface 200 and the bottom surface 202.

The lighting unit 22 is accommodating within the accommodating groove 204 and is used for emitting light to the object. The lighting unit 22 has an optical axis I, a symmetric axis of light intensity distributed in space. The optical axis I is substantially perpendicular to the bottom wall 2040 of the accommodating groove 204 when the lighting unit 22 is accommodated within the accommodating groove 204. The lighting unit 22 includes a fixing seat 220, at least one lighting component 222, a light guide component 224, and a light-reflecting component 226.

The lighting component 222 is arranged on one side of the fixing seat 220. The light guide component 224 is fixed on the other side of the fixing seat 220 and receives light emitted from the lighting component 222. The lighting component 222 and light guide component 224 are fixed to the fixing seat 220 such that the lighting component 222 and the light guide component 224 are positioned thereby and light emitted from the lighting component 222 can successfully enter the light guide component 224. The lighting component 222 is, for example, light emitting diode (LED) or compact bulb. The light guide component 224 includes a light-emitting surface 2240, light emitted from the lighting component 222 and entering the light guide component 224 transmits to the object via the light emitting surface 2240. The light-reflecting component 226 partially covers the light guide component 224 and exposes the light-emitting surface 2240. The light-reflecting component 226 is made of material having light reflecting effect (such as white or silver) for reflecting light which is not emitting form the light-emitting surface 2240 for increasing usage efficiency of light. In the practical application, the lighting unit 22 can be light bar or light tube.

The rod lens array 24 is arranged within the slot 206 and includes a plurality of rod lenses 240 arranged along a predetermined direction D. The rod lens 240 is used for imaging reflected light reflected by the object onto the sensing unit 26.

The sensing unit 26 is arranged below the housing 20 and configured to receive image light passing through the rod lens 24. The sensing unit 26 includes a circuit board 260 and a plurality of light-sensing components 262. The circuit board 260 is, for example, printed circuit board (PCB). The sensing components 262 are arranged on the circuit board 260 along the predetermined direction D and electrically connected to the circuit board 260. In particular, the sensing components 262 are correspondingly arranged below the rod lens 240. The sensing components 262 are charge-coupled device (CCD), complementary metal-oxide-semiconductor (CMOS), or other component having characteristic of photoelectric conversion.

The protecting member 28 is assembled on a top end of the rod lens array 24 (an end corresponding to the top surface 200 of the housing 20) and is used for preventing a surface of the rod lens array 24 for receiving reflected light from scratching cause by impacting, friction, or other external forces which can inference imaging quality of the contact image sensing device 2.

The protecting component 28 includes a main body 280, a recess 282 and a lighting slot 284 are formed on the main body 280. The lighting slot 284 communicates with the recess 282. An aperture of the recess 282 is larger than an aperture of the lighting slot 284. The top end of the rod lens array 24 is assembled with the recess 282, the lighting slot 284 allows imaging light reflected from the object penetrating therethrough and then entering the rod lens array 24. The protecting component 28 is made of opaque material, such as polycarbonate (PC) or acrylonitrile-butadiene-styrene (ABS) resin, and preferably, the protecting component 28 is made of material with dark colors (such as black).

A chamfered section 286 and at least one containing recess 288 are formed on the main body 280 of the protecting component 28. The chamfered section 286 is formed on a top edge of the main body 280 close to one side of the lighting unit 22 to prevent light emitted from the lighting unit 22 from blocking. The containing recess 288 is used for containing a combining component 30, such as resin. The combining component 30 combines the protecting component 28 and the rod lens array 24. In this embodiment, the containing recesses 288 are formed in two lateral side of the main body 280. In the practical application, the rod lens array 24 and protecting component 28 can be combined by buckles.

In addition, for convenience assembling the protecting component 28 and the rod lens array 24, the main body 280 of the protecting component 28 formed at least one fastening component 290. In this embodiment, the fastening components 290 are respectively formed on longitudinal sides of the main body 280, and the fastening components 290 and the containing recess 288 are arranged in a stagger manner. In a practical application, the fastening component 290 may be disposed far away from the lighting unit 22 to prevent from blocking light emitted from the lighting unit 22. The fastening component 290 is used for fixing the protecting component 28 on an assembling tool (not shown) to eliminate assembling difficulty of the rod lens array 24 and the protecting component 28.

Figure 8:
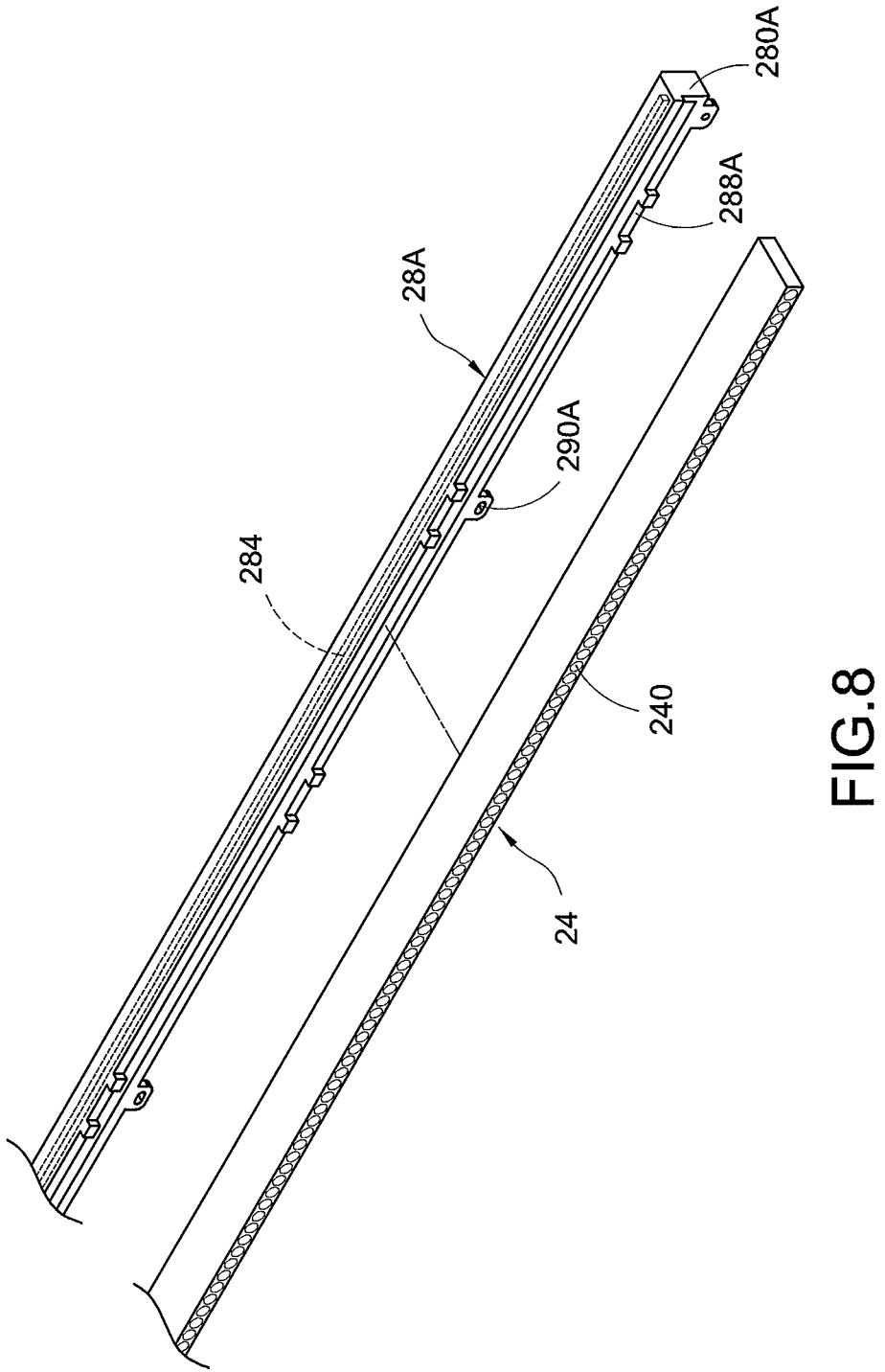
FIG. 8 is an exploded view of a rod lens array and a protecting member according to a second embodiment of the present invention.
Figure 9:
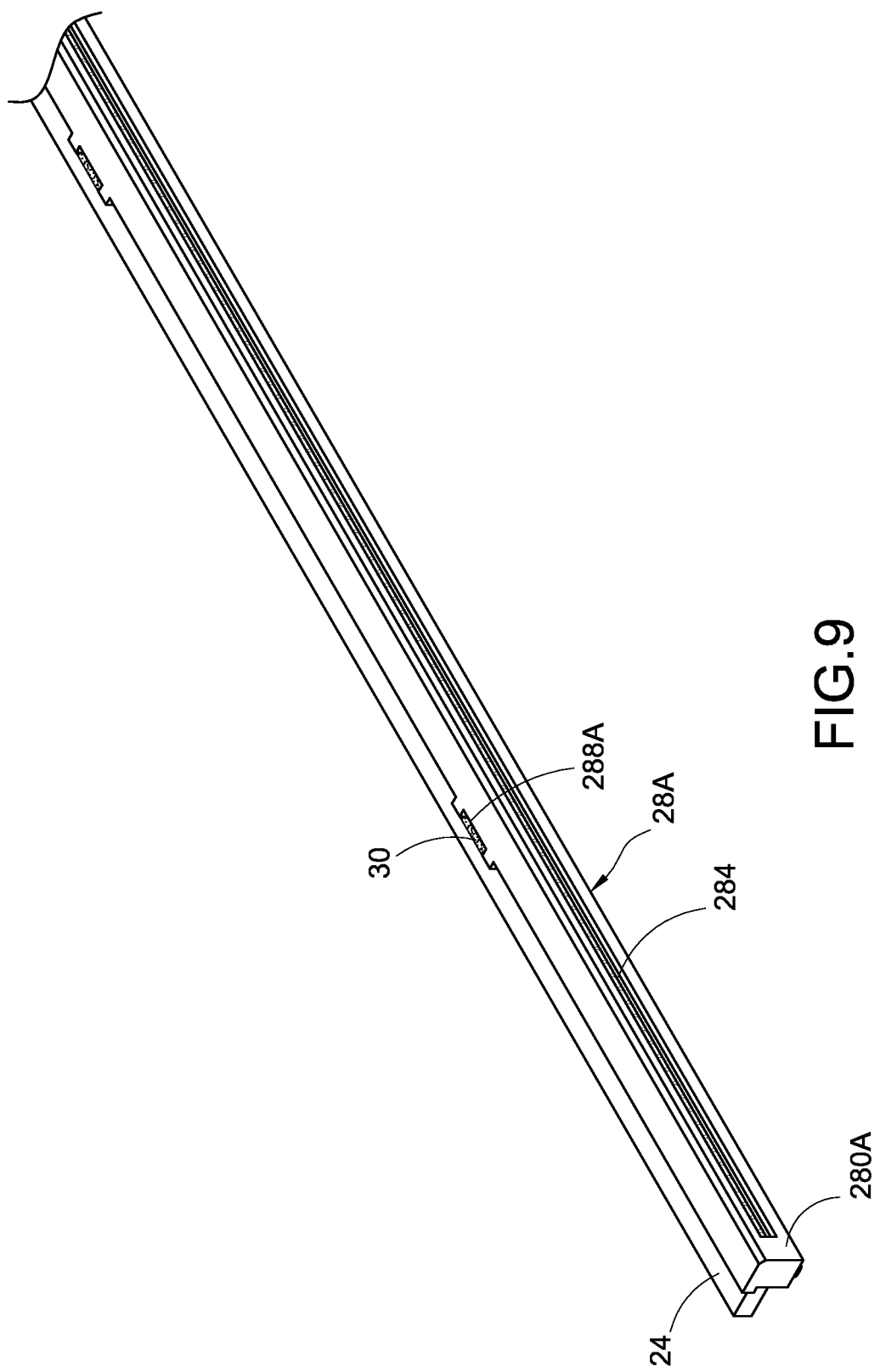
FIG. 9 is an assembled view of the rod lens array and the protecting member according to the second embodiment of the present invention.

Reference is made to FIG. 8 and FIG. 9, which are respectively an exploded view and an assembled view of a rod lens array and protecting member according to a second embodiment of the present invention. The protecting member 28A shown in FIG. 8 and FIG. 9 is similar to the protecting member 28 mentioned in the first embodiment, and the same reference numbers are used in the drawings and the description to refer to the same parts. It should be noted that containing recesses 288A of protecting component 28A are only formed on a longitudinal side of main body 180A, and fastening components 290A are formed on the other side of the main body 180A opposite to the containing recess 288A. The fastening component 290A is disposed far away from the lighting unit 22 to prevent from blocking the lighting unit 22.

Besides, in order to prevent the combining component 30 from staining by combining component 20 causing by capillary phenomena in adhesive dripping process, a height of the protecting component 28A is larger than a height of the rod lens array 24 by 1/5 of the height of the rod lens array 24. The function and relative description of other components of the protecting component 28A are the same as that of first embodiment mentioned above and therefore the descriptions are not repeated here for brevity, and the protecting component 28A can achieve the functions as the protecting component 28 does.

Furthermore, a contact image sensing device can be formed by collectively assembling the protecting component 28A, the housing 20, the lighting unit 22, the rod lens array 24, and the sensing unit 26, and the contact image sensing device having the protecting component 28A can achieve the functions as the contact image sening device 2 mentioned in the first embodiment does Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A contact image sensing device comprising:
    a housing comprising a top surface, a bottom surface opposite to the top surface, an accommodating groove formed on the top surface and concave to the bottom surface, and a slot penetrating the top surface and the bottom surface;
    a lighting unit having an optical axis, the lighting unit arranged within the accommodating groove;
    a rod lens array arranged within the slot;
    a sensing unit arranged below the housing; and
    a protecting member comprising a main body, the main body forming a recess and a lighting slot communicating with the recess, a top end of the rod lens array assembled with the recess,
    wherein the main body of the protecting member forms at least one containing recess, a combining component for combining the rod lens array and the protecting member is disposed within the containing recess, the combining component is resin.

2. The contact image sensing device in claim 1, wherein the protecting member forms a chamfered section, the chamfered section is formed on a top edge of the main body close to one side of the lighting unit.

3. The contact image sensing device in claim 2, wherein a height of the protecting member is higher than a height of the rod lens array by 1/5 of the height of the rod lens array.

4. The contact image sensing device in claim 1, wherein the protecting member forms at least one fastening component disposed far away from the lighting unit.

5. The contact image sensing device in claim 4, wherein the accommodating groove comprises a bottom wall, an including angle spans between the bottom wall and the top surface, the including angle is smaller than 90 degrees.

6. The contact image sensing device in claim 5, wherein the optical axis is substantially perpendicular to the bottom wall.

7. The contact image sensing device in claim 6, wherein the rod lens array includes a plurality of rod lenses, the sensing unit includes a plurality sensing components arranged correspondingly below the rod lenses.

8. The contact image sensing device in claim 7, wherein the sensing unit further comprises a circuit board, the sensing components are placed on the circuit board and electrically connected thereto.

9. The contact image sensing device in claim 8, wherein the lighting unit comprises:
    a fixing seat;
    a lighting component arranged on one side of the fixing seat;
    a light guide component arranged on the other side of the fixing seat for receiving light emitted from the lighting component, the light guide component comprising a light-emitting surface; and
    a light-reflecting component partially covering the light guide component, and the light-emitting surface exposing out of the light-reflecting component.

* * * * *